June 2, 1953   H. O. SCHJOLIN   2,640,368
FLUID ACTUATOR CLUTCH CONTROL
Filed July 10, 1948   5 Sheets-Sheet 1

Inventor
Hans O. Schjolin
By Spencer, Willito, Helmig & Baillio
Attorneys

Inventor
Hans O. Schjolin
By Spencer, Willits, Helwig & Baillio
Attorneys

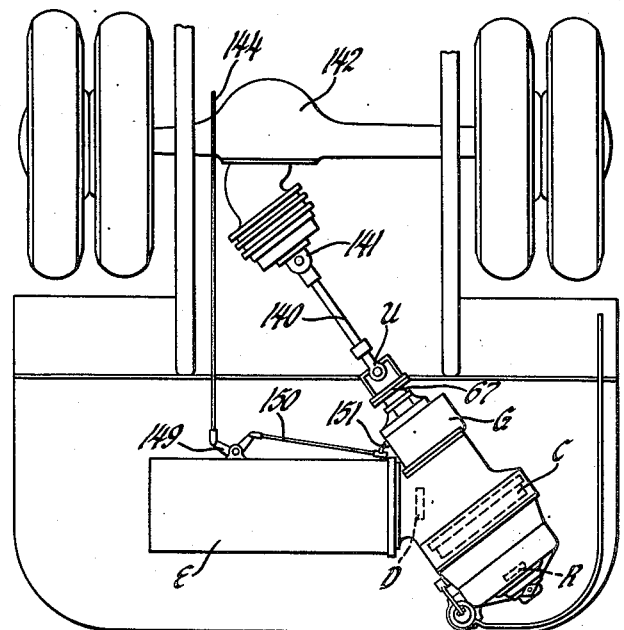
Fig. 7
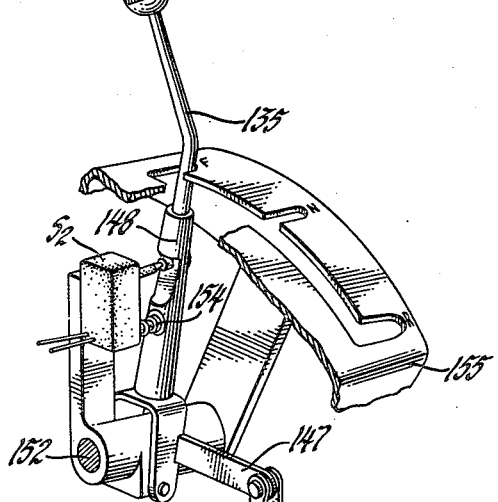
Fig. 8
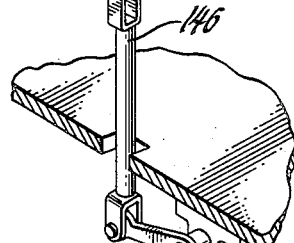

Patented June 2, 1953

2,640,368

UNITED STATES PATENT OFFICE 2,640,368

FLUID ACTUATOR CLUTCH CONTROL

Hans O. Schjolin, Birmingham, Mich., assignor to General Motors Corporation, Detroit, Mich., a corporation of Delaware Application July 10, 1948, Serial No. 38,083

15 Claims. (Cl. 74—336.5)

The present invention lies in the field of fluid servo actuation for clutch members of a power transmission, and relates in particular to arrangements of actuator mechanism for avoidance of contamination of the elements of the operative control systems for such mechanism.

It relates more particularly to an arrangement of fluid pressure passages and valving which compels one-way flow of the pressure actuating medium, and while the demonstration herewith is shown as applied to the handling of air under pressure, the invention is equally applicable to similar installations utilizing liquid under pressure. The one-way flow feature is of particular use in such air pressure installations because of the possible contamination of the air by dirt which is frequently drawn into the parts of the working system, to their detrimental operation and shortened life.

It is an object of the invention to provide such useful results through a special arrangement of valving, porting and passages devised to provide venting of the actuator mechanism on a cyclic basis, this being a one-way flow, always away from the mechanism toward the free relief point. It should be understood that in oil pressure installations the spent-pressure or exhaust system flow is redirected to the input filter or strainer sections, instead of the open air exhaust of the air system.

Additional advantages and objects will appear in the following description directed to the examples shown in the following figures:

Fig. 7 is a plan view diagram in part of the rear of a motor bus drive in which the invention is installed. Fig. 8 is a perspective view of the driver controls for the Fig. 7 construction.

Figure 1:
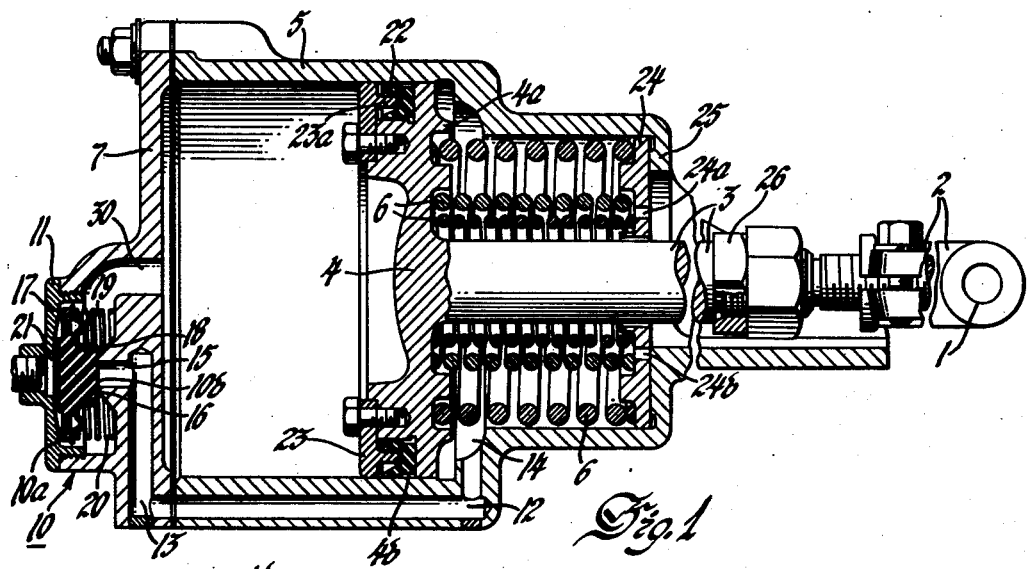
Figs. 1 and 2 are sectional views of one example of the fluid pressure servo device of the invention, Fig. 1 showing the device under applied fluid pressure, and Fig. 2 under relief conditions.

In Fig. 1, the clutch operating connection is made at the pivot point 1 of adjustable sleeve 2 threaded to rod 3 of piston 4.

The cylinder 5 encloses the piston 4 and is anchored to the power-plant framing wherever convenient to the remainder of the clutch actuator mechanism.

The body of the cylinder 5 is surfaced inside for the travel path of the piston 4, and is necked down at the right of Fig. 1 for the purpose of affording housing space for springs 6, and to provide a limit stop for the boss 4a of the piston 4.

The cylinder cap 7 is bolted to the cylinder 5 at the left, is formed to provide space for valve assembly 10 and the passages of the actuation and relief system. Screw fitting 11 is dimensioned to permit assembly and removal of valve element 10a.

Pressure relief passages 12 and 13 connect the spring chamber 14 at the right of the piston 4 with the axial bore 15 of cap 7, terminating in a flat seat 16. The inner face of the screw fitting 11 is flat surfaced for a second seat 17, as shown clearly in Fig. 2a.

The valve assembly 10 consists of a rubber-like plastic body providing a webbed flange 10a at the left and a cylindrical seal portion 10b at the right. The seal portion 10b is protected against undue expansion adjacent the face of ring 18 over which is fitted flanged piece 19 the inner neck of which surrounds ring 18, and the outer flange of which supports the webbed flange 10a and acts as a retainer for valve spring 20 backed by the planar spring seat of the cap material surrounding the nose of the seat 16.

Figure 3:
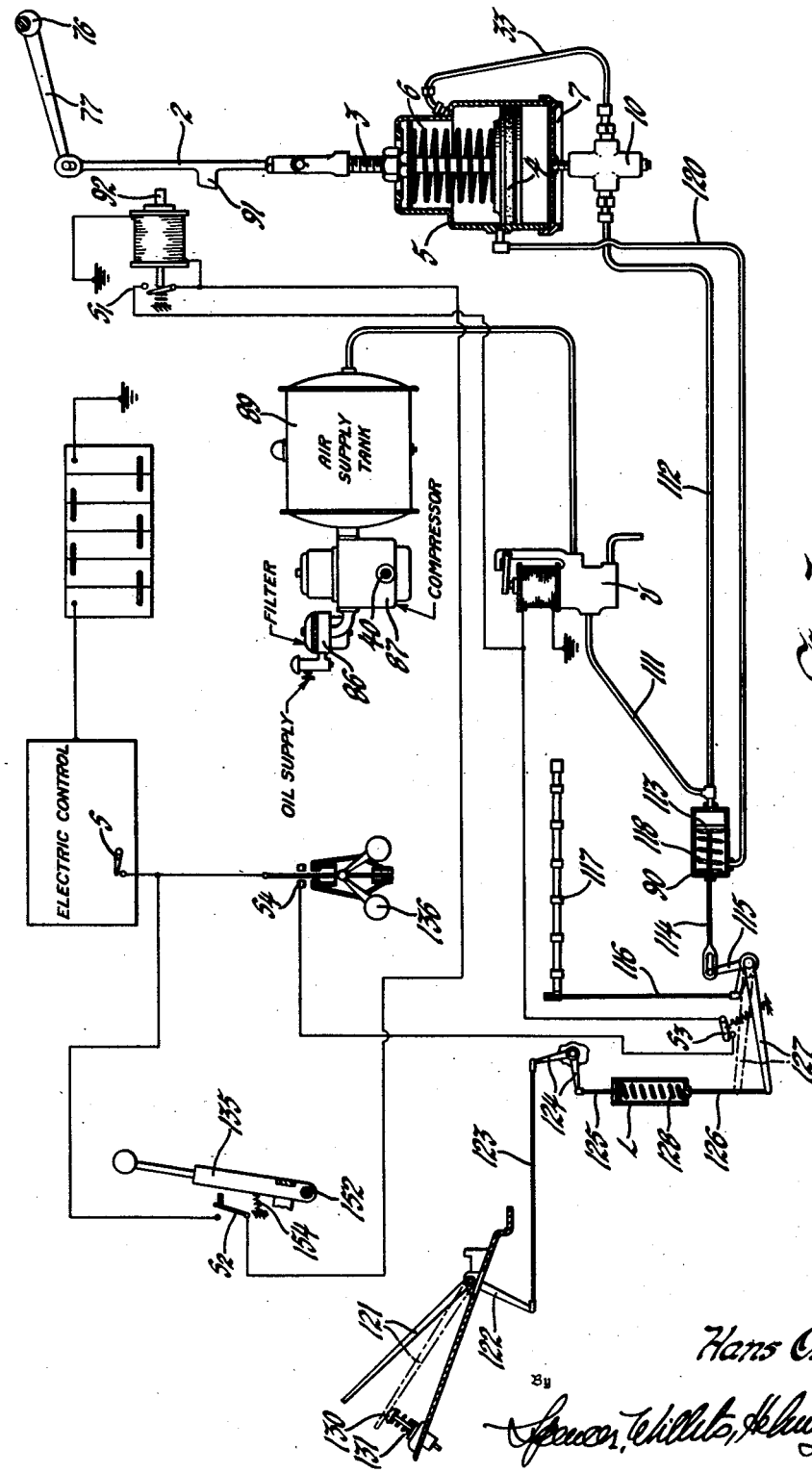
Fig. 3 is a schematic diagram of the control system in which the device of Figs. 1 and 2 appears, in modified form.

Pressure feed passage 21 is fed by pipe attached to fitting 11, the control elements of Fig. 3 showing the pipe connections, externally.

The piston 4 provides a recess at 4b to accommodate seal ring 22, supported by bolted ring 23 formed with axial ring extension 23a corresponding with channel of the seal ring 22.

The rightward end wall of the cylinder 5 has an inner surface to guide the spring retainer 24 which may move axially.

The retainer 24 is a piston-like member formed to support the axial thrust of springs 6 and may be guided in part on the rod 3. The retainer 24 is ported at 24a, and is arranged to be moved from the seat relationship with the end wall boss 25 by abutment action of adjustable stop 26.

There are two sets of ports in retainer piston 24, the ports 24a being unobstructed by the end wall, whereas the ports 24b are blanked off by the end wall at the full rightward position. This feature permits two pressure relief stages, one with both sets of relief ports open, the other with 24b closed.

In Fig. 1 the admission of air pressure from the external piping to passage 21 has moved valve 10 off its seat 17 against the force of spring 20 to admit air to main passage 30 while sealing at seat 16 against passages 15, 13 and 12. The piston 4 is therefore moved to the right against the force of springs 6 to put the rod pivot 1 into position to engage one of the clutches of Fig. 4 for example, and release the other clutch. During this operation the retainer 24 has been applied against the end wall and relief ports 24a have prevented air lock.

Continued feed of air pressure to passage 21 maintains the construction in the Fig. 1 condition.

Figure 2:
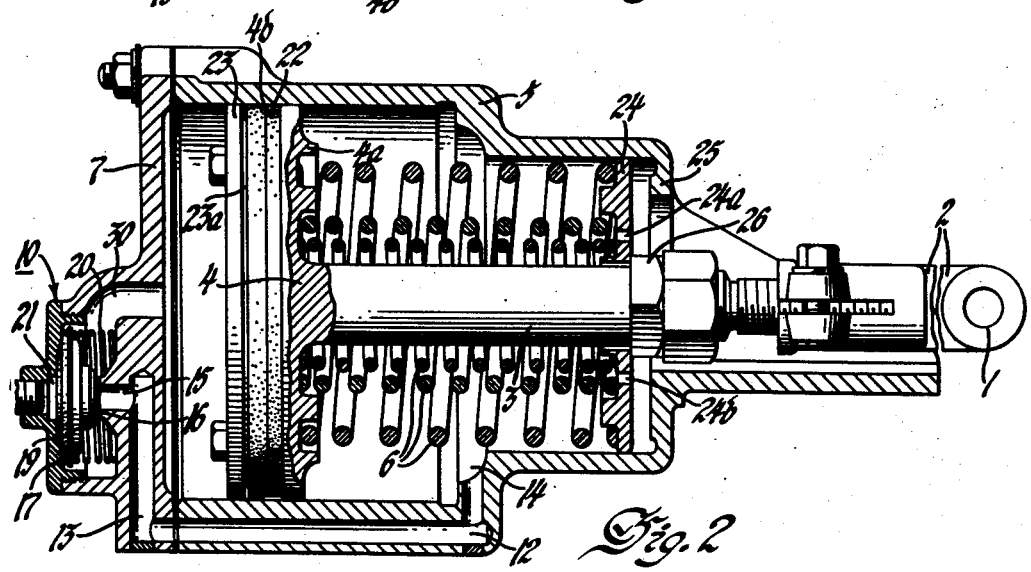
Figure 2A:
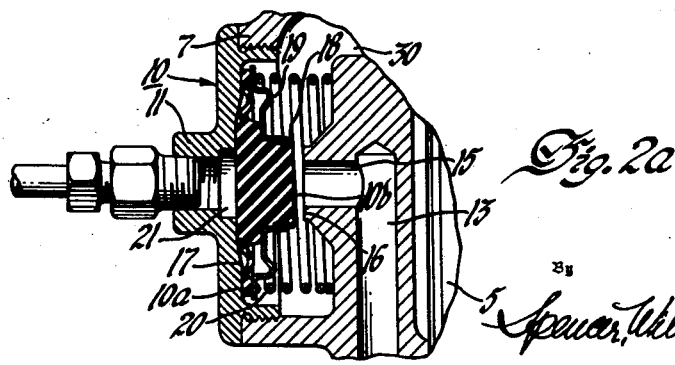

When the air pressure is cut off from passage 21 the force of valve spring 20 and the force of the pressure of the air in the cylinder tend to move the valve 10a to the Fig. 2 position, where it seals at 17 and is open at 16.

The instant the port at 16 is open, the pressure of the air trapped at the left of the piston 4, augmented by the force of springs 6 is relieved thru passages 13 and 12 into the cylinder space at the right of the piston 4, which space, by reference to Fig. 1 had been under atmospheric pressure.

The leftward motion of the piston 4 and rod 3 biased by the force of springs 6 now brings the adjustable stop 26 against the retainer piston 24, opening the relief port 24b which had been seated against the end wall.

Tracing thru the cycle of this operational sequence, one finds that the body of air which had been admitted from the pressure feed system has been delivered to the space behind the piston 4 and from there to atmosphere. This feature has the useful result of avoiding dirt and oil contamination of the valve mechanism and of the control system passages, whereas other methods result in sucking of contaminative material into the vital parts of the system, which shortens useful life and makes breakdown hazard rather high.

Since this equipment is particularly used in mass transportation vehicles, the requirement for continued operation with surety of controls, is severe, hence the present invention serves a highly useful purpose, for the atmospheric air is never drawn into the cylinder passages on the back stroke, or the relief stroke of the piston.

The point is clear when the transition from the Fig. 2 to Fig. 1 condition is studied.

The re-application of pressure in passage 21 from the external controls of Fig. 3 first unseats valve 10 from seat 17 and seals the port 16 of passage 15. From this point on the piston travels to the right, the body of air in the rightward cylinder space being relieved at ports 24a and 24b, and finally at port 24a. The spent flow of air is always to atmosphere and never reverses, since there is no vacuum condition in the passages at the left to cause reversal.

The expansion of the pressure space air body on the relief stroke serves to cool the parts of the servo device, avoiding softening of the rubber-like seal materials used. These are important advantages.

The admission and control of air pressure to the positive pressure face to the left of servo piston 4 of Fig. 1 is obtained by the control arrangement of Fig. 3, which is a diagram of the fundamental elements and units required.

Figure 4:
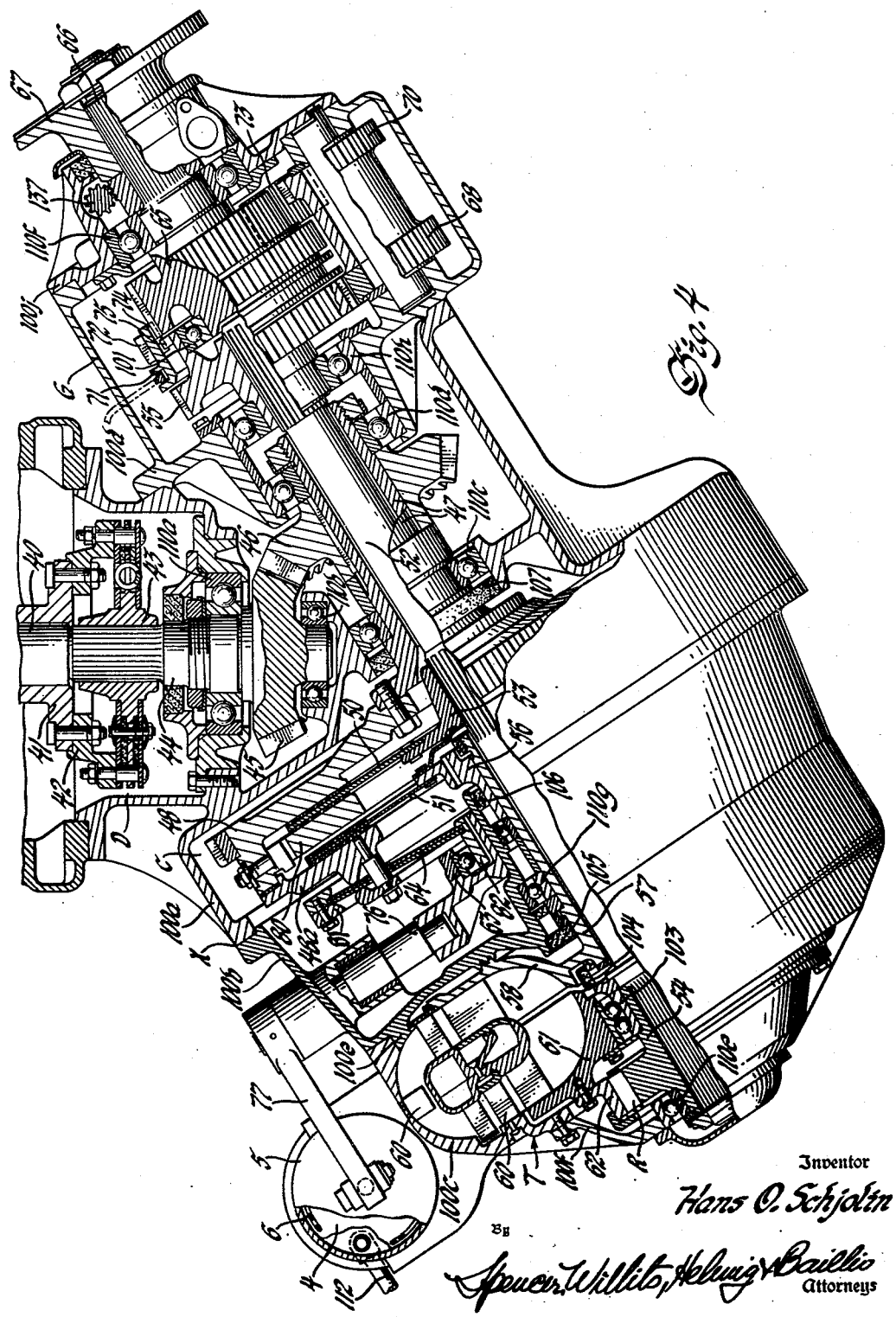
Fig. 4 is a sectional drawing of a power transmission installation in a vehicle, to be controlled by the devices shown in Fig. 3, and embodying a construction utilizing the principles of the constructions of Figs. 1 and 2.

The clutch shifting piston 4 is shown in cylinder 5, and in Fig. 3 is ready for rocking the clutch operating lever 77 toward the up position, in which the collar 63 of Fig. 4 shifts the spring 64 to load clutch plate 50.

The diagram of Fig. 3 shows air filter 86 which traps dirt and moisture, delivering clean, dry air to the intake of the compressor 87, driven by a power connection from the shaft 49 of Fig. 4. The compressor device 87 provides air under pressure to tank 89, which air contains a slight quantity of oil vapor, and the magnet valve V controlled by the circuit current supplied, delivers air pressure to the piping 111—112 connected to cylinder 5 and to cylinder 90.

Figure 5:
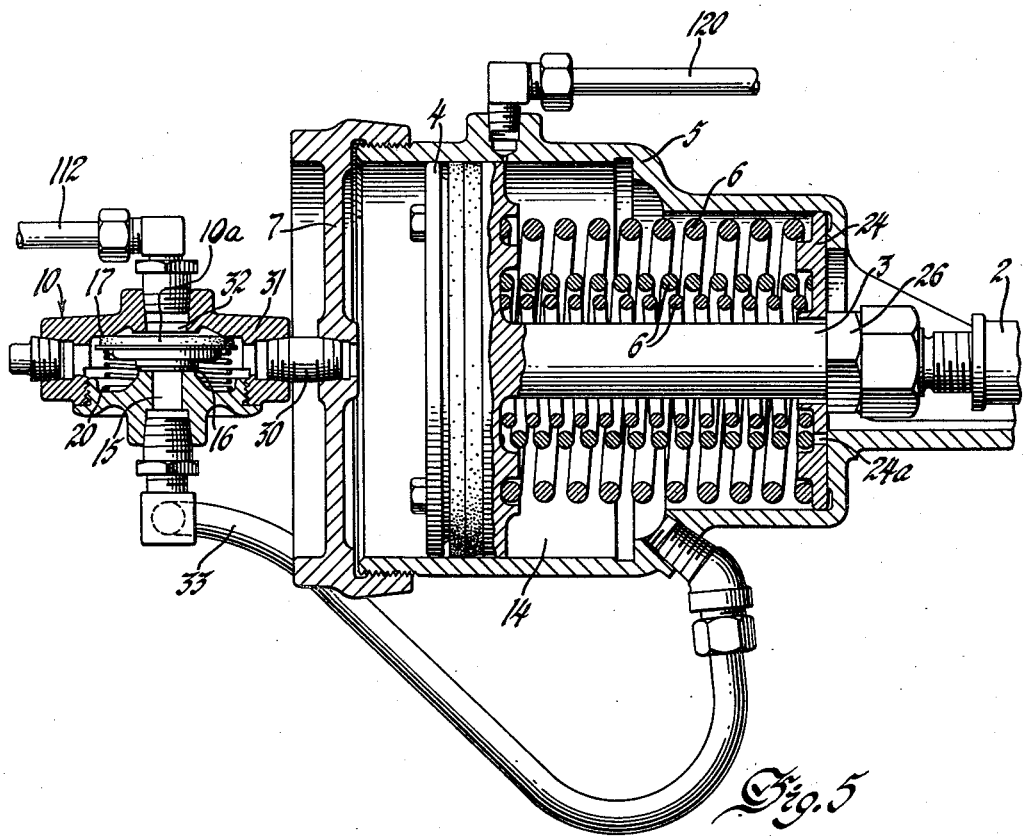
Fig. 5 is a modification showing similar to that of Figs. 1 and 2, but involving the combination control arrangement in which the servo cylinder is centrally ported in order to accommodate the special form of coordinate control of Fig. 3 explained in detail below.

The servo piston-and-cylinder arrangement shown in Fig. 3 is that of Fig. 5 herein, which provides the parts details comparable to those shown in Figs. 1 and 2. As will be understood, it is not necessary for the magnet valve exhaust to relieve the pressure of cylinder 5.

The magnet valve V, such as is shown in my U. S. Letters Patent No. 2,322,479, in Fig. 3 thereof, delivers filtered reservoir air pressure to the cylinder 5 for raising the piston 4 against springs 6, or shuts off the reservoir pressure and releases pressure from cylinder 5, to permit springs 6 to lower the piston 4.

Supply of current to the magnet valve V passes through stop switch $S^1$, and gear lever switch $S^2$ from the battery and generator system; and also passes through overrule switch $S^3$ and governor switch $S^4$; in parallel paths.

The rod 2 is equipped with a striker 91, which intersects the lock pin 92 of stop switch $S^1$ when air pressure lifts the piston 4 toward direct drive position.

Air pressure delivered by the magnet valve V to line 111 reduces the engine throttle setting, the small piston 113 of cylinder 90 having rod 114 linked to bellcrank 115 pivoted to rod 116 of the fuel injector rack 117, and operating against the force of spring 118. The clutch operating cylinder 5 is ported to air line 120, connected to the left portion of the throttle control cylinder 90, so that when the clutch piston 4 rises beyond the port of line 120, the air pressure may flow to the leftward face of piston 113, equalizing that exerted on its rightward face, whereupon the restoring spring 118 returns the throttle rod 116, bellcrank 115 and rod 114 to original position.

Supply current passes through the master switch S, located convenient to the operator, and divides through two paths, one to the governor switch $S^4$, overrule switch $S^3$ and magnet valve V; the other to the gearshift lever switch $S^2$, solenoid stop switch $S^1$ and magnet valve V.

The accelerator pedal 121, operates lever 122, rod 123, bellcrank 124 and the rod 125 of lost-motion device L, the casing of which is attached to rod 126 of arm 127 of bellcrank 115 controlling the throttle rod 116. The spring 128 normally transfers thrust between rods 125 and 126.

At full throttle, the pedal 121 strikes overrule button 130 of spring 131 mounted under it on the floor board, which thereupon increases the pedal resisting force, and the lost motion device L transfers force to lever 127 to the overruling switch $S^3$, breaking the circuit to the governor switch $S^4$ and magnet valve V, which causes a transfer of drive from direct-drive clutch plate 50 to torque converter plate 51.

When the vehicle is at rest, with the engine running, the operator's master switch S, being normally closed, the gear lever 135 of Fig. 3 being moved to forward drive position, engages the slider 71 of Fig. 4 with the teeth 75 of member 55.

Increasing the engine throttle causes the torque converter to deliver torque to shaft 52, since clutch plate 51 is normally engaged by springs 6.

The governor 136 of Fig. 3, driven by gear 137 of Fig. 4 closes switch $S^4$, the battery current passing through closed overrule switch $S^3$ to magnet valve V, which energised, opens reservoir pressure to cylinders 5 and 90. The clutch piston 4 rises to rock lever 77 to release clutch plate 51 and engage direct drive plate 50, piston 113 first moves left in cylinder 90, to close the throttle momentarily. As soon as piston 4 uncovers the port of line 120, the air pressure equalizes on the faces of piston 113, and spring 118 re-opens the throttle.

Drive thereupon continues in direct drive, unless the speed of governor 136 falls sufficiently to open the switch $S^4$, whereupon the magnet valve circuit is broken, and the valve V shuts off the feed pressure and releases the pressure in clutch cylinder 5, so that springs 6 reset the clutch arm 77 and collar 63 of Fig. 4 to load clutch plate 51 for drive through the converter T.

In this control, momentary idling of the throttle upon upshift to direct drive by means of the governor control serves the useful purpose of shortening the shift interval during which excess drag wear of the friction clutches could otherwise occur. It is not found necessary to apply the reactive control upon the engine throttle during the downshitf to converter drive, with this construction. The roller clutch R does not transmit torque until rotor 61 attempts to exceed shaft 52 in speed.

The accelerator pedal 121 at or beyond full throttle position may break the circuit to the magnet valve V, by opening the overrule switch $S^3$ and thereby set aside the action of the governor 136. The driver has the option of initiating a downshift by pedal advancing movement, due to the feel provided by overrule spring 131. The linkage of the pedal 121 to the lost-motion device L, and to the overrule switch $S^3$, and the force of spring 131 are so arranged that the operator feels a decided resistance to further travel of pedal 121, just before the mechanism would open switch $S^3$. This pedal-overruling action may be set to occur at about full throttle setting, beyond, or somewhat below, in accordance with the selected drive and engine characteristics.

When the air pressure is sliding the piston 4 to the up position, as for direct drive, the striker 91 abuts lock pin 92 of solenoid switch $S^1$ at a travel point of piston rod 3 generally equivalent to a release position for both clutch plates 50 and 51, by collar 63 of Fig. 4, halting beyond the point.

The above described control disclosure of Fig. 3 is equivalent to the subject matter of Figs. 16 and 17 of my application for Letters Patent, Serial No. 299,643, filed October 16, 1939, and matured as U. S. 2,380,677 on July 31, 1945.

The engine shaft 40 of Fig. 4 terminates in flange 41 which is bolted to the driver ring 42 of the friction vibration dampener assembly D, the driven hub 43 of which is splined to the transmission input shaft 44, the latter being formed integral with bevel gear 45 meshing with bevel gear 46 of the transmission input sleeve 47.

The input driving drum 48 is bolted to sleeve 47 and is a part of the double clutch assembly C which connects the drive of the engine with either of driven clutch plates 50 or 51.

The transmission main shaft 52 is splined to accommodate the hub 53 of clutch driven plate 50; it extends through the transmission to the left where it is splined to the inner member 54 of the roller clutch assembly R, and extends to the right where it is splined to drive the combination gear and jaw clutch 55 of the reversing gear unit G.

The clutch plate 51 is riveted to hub 56 rotating with sleeve 57 integral with the impeller 58 of the torque converter unit T. The torque converter unit T shown in section in the present example of Fig. 4, is similar to that of my U. S. Letters Patent 2,308,113 filed October 4, 1940, and issued January 12, 1943. The unit consists of three fundamental elements; an impeller 58, a reaction blade assembly 60, and a driven turbine member 61, the latter being bolted to the external member 62 of the roller clutch assembly R. Collar 63 slides axially to shift the inner radial fingers of the clutch plate loading spring 64.

At the right of Fig. 4 is shown the reverse gear unit consisting of a gear train having input member 55, and output gear 65 integral with shaft 66, splined to the output driving flange 67. The gear 55 meshes with input countergear 68 which is rotatable with the countershaft section, to which the second countershaft gear 70 is attached or is integral. A splined collar 71 toothed externally at 72 for meshing with reverse idler gear 73, is carried on a forward extension of the teeth of gear 65 with which its internal teeth 74 mesh. The gear 55 has external clutch teeth 75 which are engaged with the teeth 74 of the slider 71, when the latter is moved into forward drive position. The train of the gear unit consists of input gear 55 splined on shaft 52 and constantly meshed with the countershaft group 68, 70 which spins idler 73. The slider 71 carries internal teeth 74 which may be driven by teeth 75 of gear 55 when the slider 71 is advanced to the left as shown in Fig. 4. For reverse shift, the slider is moved to the right, disengaging teeth 74, 75 and meshing teeth 72 with the teeth of reverse idler 73. Since the torque converter delivers no drive torque at idle throttle when this shift is made, the shift proceeds without a need for a neutral dwell so that internal teeth 74 of slider 71 may shift directly from mesh with 75 while teeth 72 mesh with idler 73.

When the slider is moved toward the rear of the gearbox it establishes the drive through the reverse train 55, 68, 70, 73 and 65.

In the particular arrangement and demonstration of the drive noted above, the bevel gears 45 and 46 are related to each other in the ratio of 4 to 5 respectively, so that the sleeve 47 and driving drum 48 may rotate at a somewhat slower speed than that of the engine.

The vibration dampener unit D is arranged to permit limited and damped differential vibrational movement between the shaft 44 and the shaft 40 in a well-known manner and is not an essential device of the present invention.

The unusual arrangement of the foregoing-described drive has a number of advantages, as for example the diagonal casing 100a may be completely detached for unit replacement. It is useful that the casing portion 100c may be detachable from 100b for service to turbine parts, and also that 100b be detachable from 100a so that different designs or forms of torque converters and clutches may be installed. It is an advantage that the casing portion 100f at the leftward end may be readily detached without disturbing the remainder of the driving mechanism, to replace or adjust the freewheel clutch R. It is of further value that the joint at X between casing sections 100a and 100b be provided. It will also be noted that the reversing gear unit G may be separated by ready removal of the casing portion 100d, so that whatever adjustments or replacements are required in this unit may be readily made, quickly and simply.

To accomplish the above successfully, it is essential that the arrangement and gearings to support the shaft and driving parts correspond with the major axes of drive. To this end bearing 110a and bearing 110b support the transmission input shaft 44 firmly in the casing section 100a. The diagonal main shaft 52 is supported in bearings 110e and 110h in the casing sections 100c and 100d, while the input driving shaft sleeve 47 is mounted in casing 100a and 100d in bearings 110c and 110d. The rear shaft 66 is piloted by bearing 101 in the inner pocket of gear 55 of shaft 52, and for support in the casing 100d and the flange plate 100f by bearing 110f. The torque converter sleeve 57 is supported in web 100e of the casing section 100b by bearing 110g, and the circumferential guide rings for the impeller 61 such as shown in Fig. 4 may provide support in web 100e. The sleeve 63 of the clutch operating mechanism is mounted to slide on an extension of the web 100e, for supporting the leftward portion of hub 56 and the sleeve 57, and the double-row bearing 103 may align the turbine rotor 61 with respect to the shaft 52 and the roller clutch inner member 54.

The arrangement of the present demonstration includes the seal 104 between the turbine 61 and the hub of impeller 58 and the flange of 54, the seals 105 located between the hub of impeller 58 and the web 100e of the casing; and the seal 106 presents leakage of grease through the shafting and the extension of web 100e into the compartments formed by casing for the clutch assembly C. The seal 107 is located externally with respect to sleeve 47 and prevents flow of lubricating oil from the gear spaces of casing section 100a into the compartment housing the clutches 50 and 51.

The clutch collar 63 of Fig. 4 may be controlled for its transfer of drive between the clutch plates 50 and 51 by cam member 76 mounted to rotate in the sidewall of the casing 100b as shown in Fig. 4. The cam 76 is rotated by arm 77 reciprocated by the piston 4 shown in section in Figs. 1 and 2. A method of operation of this double clutch control apparatus is described in my U. S. Letters Patent No. 2,308,113, filed October 4, 1940, and issued January 12, 1943, and shown in Figure 6 of that patent.

Figure 6:
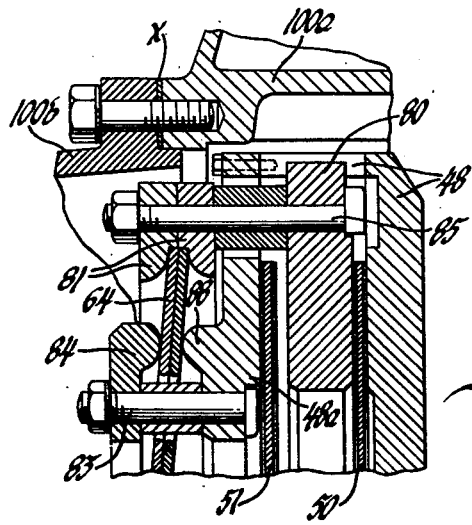
Fig. 6 shows in sectional detail a portion of the clutch actuator mechanism of Fig. 4.

Fig. 6 shows in details the relationship of the parts operated by the clutch actuator mechanism to provide alternate drive by the clutch drum 48 of the clutch discs 50 and 51.

Engine-connected gear 46 and sleeve 47 support and drive the presser plate 80 in its gripping of disc 50 or disc 51. Shaft 52 carries splined hub 53 and disc 50 equipped with proper facings. Rotating about shaft 52 is hollow shaft 57 attached to splined clutch hub 56 of disc 51 which also has proper friction facings.

Shaft 47 may drive shaft 52 directly thru clutch disc 50 or indirectly thru the torque converter unit shown at the left of Fig. 2, by clutch disc 51.

The clutch control and actuator mechanism consists of fittings 81 bolted to member 48, arranged to restrain the external edges of compound disc spring 64, the inner edges of which may be shifted to the right or to the left by movement of bearing sleeve 82 and sleeve 63 longitudinally through eccentric 76 moved from outside the gear casing by lever 77.

The fulcrum action is provided by studs 83 and members 88 and 84. Backing plate 48a carries studs 83 passing thru apertures in disc spring 64, the studs support ring 84, while the facing portions of 88 and 84 are shaped to bear against the faces of spring 64 located between them.

The fittings 81 are attached to bolts 85 headed in the outer portion of presser plate 80, and a spacer collar provides proper longitudinal positioning between the fittings 81 and the plate 80 so that upon axial movement of member 63 the disc spring 64 is flexed about the fulcrum afforded by members 84—88, and a parallel motion of fittings 81, bolt 85 and plate 80 in the same direction of motion of member 63 results, the plate 80 gripping the plates 50 or 52 against 48a or 88 at the end of the movement. The force of spring 64 is of course, exerted reactively upon the collar 92 and shaft-cam mechanism connecting to lever 77, rod 2 and piston 4.

The construction of Fig. 5 as noted above in the Fig. 3 description is somewhat different from that of Figs. 1 and 2. The pivot 1, adjustable member 2, rod 3, piston 4 and adjustable stop 25 are the same. Cylinder 5 is screw capped at 7, but the passage 30 is a pipe connection to valve body 31.

The body 31 is drilled for passage 32 and formed at seat 17 for the quick release valve element 18a loaded by spring 20. The opposite seat 16 surrounds passage 15 connected by pipe 33 to the retainer chamber 14 of piston 4. The retainer piston 24 is freely mounted about rod 3, but is accurately guided by the inner cylindrical wall of the cylinder 5. Ports 24a only are required since a measured relief of air pressure is provided by the loose fit of retainer piston 24 about shaft 3.

In the Fig. 5 arrangement, there is somewhat more reliance on the transfer of pressure from the leftward to the rightward spaces of the cylinder during the relief phase of the cycle, which permits a possibly greater predetermining of the timing of the relief stroke, if for any reason it be required to release a clutch slowly rather than rapidly. In some power transmissions having plural ratio clutches, it is desirable to control the transfer of torque from one to the other in such a way that the dying out of torque on a released clutch is determined for a given time interval during which the building up of torque on the concurrently engaged clutch is sufficiently rapid to overlap the diminishing torque of the releasing clutch. The present invention contemplates the application of the control features described herein to such installations, although the main example herein does not require special plural clutch overlap controls other than those inherent in, and embodied in the dimensional limits of the parts.

Figure 7 is a partial view of a rear drive plan of the invention applied to a motor bus. In this figure, the engine E driving through a vibration dampener D, delivers its torque to the output shaft flange 67 through one of the clutches of the double clutch assembly C; or through the other of said clutches coupled to a turbine torque converter and through a roller clutch R, located at a point convenient for inspection and replacement. A gearbox G provides the means for selecting forward and reverse drive, or neutral. In Figure 7 is shown a universal joint U connected to output driving flange 37, and driving a diagonal jack shaft 140, universal joint 141 and differential gear 142 which in turn transmits the drive to the vehicle wheels. The only angular conversion of power between the engine and the parallel rear axle, other than by the differential gear of the axle, is by the power shaft input gearing adjacent the vibration dampener D.

Figure 4 described above, shown in plan detail the structural arrangement of the supporting and driving parts. It should be observed that the engine casing, clutch and converted housings and gear casing are integrally supported against torque reaction.

The casing at the left of Figure 4 has flanged plate 100f removable for service or replacement of roller clutch R without disturbing the other drive elements, and the external member of the unit R is removable by releasing bolts (not numbered). The turbine casing 100b is joined to the clutch casing 100a at X by stud bolts or equivalent fastenings, so that the turbine device and its clutches are readily serviced or replaced without affecting the other more permanent units of the drive mechanism.

Figure 8 is a perspective view in part section of the gear lever interlock control shown in Figure 3.

Figure 8 described above is a diagrammatic disclosure of the external controls for the device of the invention, showing the means for controlling the structure of Figure 4 automatically, while affording overruling control by the operator when required.

The drive structures in the Figures 1, 2, 4, 5 and 6 are those required to illustrate a fully-operating disclosure of drive mechanism to which the ratio shift actuation and controls of Figure 3 are applied, embodying the particular construction of Fig. 5.

Referring to Figure 7, shift control rod 144 is connected to bellcrank lever 145 of Figure 8 pivoted to rod 146 extending through the floorboard and pivoted to arm 147 of part 148 of Figure 8; and rocks bellcrank 149 of Fig. 7 pivoted to rod 150 having swivel connection with the arm of shifter fork 151 of Fig. 4.

Gear lever 135 of Figure 3, is fastened to shaft 152 rocking with mounting 148 located forward in Figure 8, at the operator's station. The lever 135 and mount 148 rock fore and aft, the pivot mounting of the lever 135 permitting a small lateral motion of the mount 148. The lever 135 is guided in the E-slot of the upper portion of the casing 155 for reciprocation, and for lateral motion into the slot passages F, N and R for forward, neutral and reverse shift operation.

Switch $S^2$ of Figure 3 is supported adjacent the lever 135, which is biased toward the gear station positions by spring 154.

The striker pin 92 of $S^1$ always protrudes in the path of the striker 91 of rod 2, whenever the gear lever 135 is in the left, or continuous portion of the E-slot, with switch $S^2$ closed. This halts the piston 4 of the cylinder 5 in mid-position or neutral, as the air under the piston 4 causes it to rise.

The lever 135 mechanically operates slider 71 of Figure 4 by appropriate linkages, and its action represents an improvement over the arrangement of Figure 9 of my Letters Patent U. S. 2,322,479.

The foregoing description of the invention as applied to drive constructions for vehicles emphasizes a principle believed novel in this art, shown broadly in Figs. 1 and 2 and more specifically in Figs. 3 and 5 in conjunction with the other controls. This principle is primarily the use of a uni-directional fluid pressure flow thru the clutch actuator servo mechanism, so arranged that there is no reversal of flow, nor suction effect which could draw contaminative material into the servo control and actuation system. In this system, clean, filtered air is stored under pressure, with a vapor of lubricant mixed with the air, serving to maintain the various seals flexible and the sliding parts reasonably frictionless. While air compressors normally are arranged to furnish clean dry air, and since they run in oil, it may be thought that such action would be sufficient for the purposes of the present invention, however, it will be noted that the filter device 86 of Fig. 3 is equipped with a separate oil supply which may be fed thru a small jet placed adjacent the suction ports of the wick, in addition to the customary moisture trap, such that the objective stated above is deliberately, rather than accidentally obtained.

The devices in the field of heavy duty vehicles for controlling the drive mechanisms have always had short life in buses, the major troubles being air leakage, excessive wear, and failures of seals and springs, much of which is caused by dirt and moisture sucked into the air systems from the rear side of the servo piston during the exhaust stroke. It is common to attempt to avoid this problem by sealing the space between piston rod and cylinder wall with a flexible bellows boot, and pass that air body thru a filter. This expedient does not suffice, the end-point results are poor, the boots are not durable, the filters tend to fill with dirt quickly, and continued operation is impaired.

These devices must be adequately lubricated under particularly adverse circumstances. There is a tendency for the piston packings to wipe the cylinder walls clean during the exhaust stroke, so that the wall is relatively dry during the ensuing pressure stroke, promoting undue wear. During the exhaust stroke atmospheric air deposits dirt and moisture on the operating surfaces, causing corrosion. Furthermore, the common practice of steam-cleaning the structures of mass transportation vehicles finds the air servo mechanisms vulnerable, water being forced in thru the vent passages. These conditions are aggravated by the heat of the power plant compartments, which softens the rubber or composition seals.

The present invention overcomes these defects by preventing any atmospheric air from being sucked into the system thru the servo exhaust passages, since its air bodies are always moved thru the system in a one-way manner, the primary air being dried, cleaned and given a small quantity of lubricating oil vapor. In this way a long and useful life of the parts is assured.

The applicant's flexible transfer valve which provides the one-way air flow thru the servo cylinder is made of synthetic rubber, and directs the pressure air two ways, to servo pressure space for the power stroke and re-directs the power stroke air body to the servo exhaust space, where a light film of lubricant is deposited as the air body is relieved. It should be understood that the pressure of the power stroke body of air is reduced by expansion into the exhaust space, which provides a cooling action believed novel in these mechanisms. The return stroke occurs rapidly, since the air relief space and passages are closely adjacent the pressure space and exhaust directly rather than by return to the master directing valving. The refrigeration effect described is believed novel.

Having now described the invention fully herewith with clear examples of its application, so that one skilled in the art is able to reproduce and make successful use thereof by following the teachings given in this application, it is to be particularly understood that the invention is not to be strictly limited to the specific examples provided, and that various changes in detail, design, construction and arrangement may be made without departing from the spirit and scope of the invention as particularized in the appended claims, wherein I claim:

1. In fluid pressure actuated power transmissions, wherein a fluid pressure supply system embodying fluid pressure pump and storage means also embodies control valving adapted to feed to and to cut off fluid pressure from clutch actuator mechanism, the combination of clutch operating means including control valving and a servo cylinder having a contained translatable piston dividing two end chambers, one chamber of which is adapted to receive the pressure fluid fed from said valving for moving said piston to diminish the effective volume of the other chamber, the second chamber being connected to exhaust, a transfer passage connected to said second chamber, a valve spring, a pressure responsive valve loaded by said spring subject to the pressure of the fluid fed to said first-named chamber by said valving for closing said transfer passage and subject to the force of said spring for connecting said passage with said second chamber when said control valving is set to cut off the pressure fluid feed to said first-named chamber, a variable speed ratio drive having ratio-determining clutches actuatable by said mechanism, control linkages connecting said piston with said mechanism, and an operator-operated control means effective to select the action of said control valve means and said pressure-responsive valve, said control valve means including a pressure fluid directing valve having a delivery passage connected to cause said pressure responsive valve to move against its spring force to open and to deliver actuating fluid pressure thereafter to that one of said chambers first mentioned, and said pressure responsive valve having an exhaust port exclusively operable to connect to said transfer passage when said pressure directing valve is moved to cut off the pressure feed to said first-named chamber.

2. In fluid pressure actuated power transmissions, wherein a fluid pressure supply system embodying fluid pressure pump and storage means also embodies control valving adapted to feed to and to cut off fluid pressure from clutch actuator mechanism, the combination of clutch operating means including control valving and a servo cylinder having a contained translatable piston dividing two end chambers, one chamber of which is adapted to receive the pressure fluid fed from said valving for moving said piston to diminish the effective volume of the other chamber, the second chamber being connected to exhaust, a transfer passage connected to said second chamber, a valve spring, a pressure responsive valve loaded by said spring subject to the pressure of the fluid fed to said first-named chamber by said valving for closing said transfer passage and subject to the force of said spring for connecting said passage with said second chamber when said control valving is set to cut off the pressure fluid feed to said first-named chamber, supplementary valve mechanism for said second named chamber subject to the movement of said piston for providing a staged control of the period of exhaust from said second named chamber, said supplementary valve mechanism consisting of a movable valve element subject to variable force derived from motion of said piston and to the pressure of said second-named chamber, and having a supplementary exhaust port through which the said pressure is relieved during the said exhaust period.

3. In power controls especially applicable in the art for controlling variable speed transmission drives, a clutch arranged for auxiliary power control, clutch actuator means for said clutch including a member movable to a clutch engaging position, and including an air cylinder-and-piston actuator device, said device for said member embodying a pressure space at one side of said piston and an exhaust space at the other side thereof adapted to be connected to said pressure space through a controlled passage, control valving operative to transfer pressure from said pressure space to said exhaust space by said controlled passage under one controlled operating condition, spring means adapted to force said piston toward the said pressure space, an exhaust valve for said exhaust space provided with porting for exhausting same at one exhaust rate during said operating condition, and means subject to the movement of said piston when under the force of said spring means to cause said exhaust valve to relieve the pressure of said exhaust space at higher rate than said first rate provided by said exhaust valve.

4. In the combination set forth in claim 3, wherein are included an air pump, reservoir and feed control valving connected to said means for establishing clutch shifting by said actuator means, the sub-combination of said controlled passage acting as a pressure transfer passage adapted to connect said spaces, and of a pressure responsive valve of said control valving exposed to the pressure delivered by said valving to said pressure space for closing said transfer passage for one setting of said valving, and for opening said transfer passage for another setting of said valving.

5. An air servo cylinder having pressure and exhaust spaces containing a sliding piston dividing said spaces and a plurality of biasing springs normally acting and operative to urge said piston toward said pressure space, said spaces being adapted to be connected by an exhaust transfer passage, certain of said springs being located in said exhaust space, an air feed passage, said exhaust transfer passage opening into both said spaces, a valve spring, a pressure-responsive valve located in said pressure space and subject to the force of said spring and to the opposing force of air pressure furnished by said feed passage, said pressure-responsive valve being adapted to close said exhaust transfer passage at times when said feed passage is delivering air pressure from said air feed to said pressure space, and being adapted to open said exhaust transfer passage while closing said feed passage at times when the said feed passage is not delivering air to said pressure space, and an exhaust valve located in said exhaust space movable with said piston and operative to relieve to atmosphere the air pressure furnished to said exhaust space by said exhaust transfer passage during intervals when said pressure space is cut off from air pressure feed and when said biasing springs are urging said piston toward said pressure space, said exhaust valve being urged toward closing position by the force of said springs located in said exhaust space.

6. In the combination set forth in claim 5, wherein there is an air supply and control valving connecting said feed passage with said supply, the sub-combination of an air body transferred by said transfer passage from said pressure space by opening of said pressure-responsive valve, and an abutment movable with said piston operative to open the exhaust valve of said space and exhaust said air body at a predetermined travel point of said piston when the latter is urged by said springs toward the said pressure space.

7. In the combination set forth in claim 5, the sub-combination of said pressure-responsive valve having a pressure face exposed to the pressure of said feed passage and having an opposite exhaust-sealing face, and of a body for said valve adjacent the pressure space of said cylinder with the ported connections for said feed and exhaust transfer passages, located oppositely in said body, an air delivery passage from said body to said pressure space, and of a spring concentric with the said faces for urging said valve to cut off the feed of said feed passage and to connect the said exhaust transfer passage with said delivery passage for connecting said pressure and exhaust spaces.

8. In power transmission devices embodying shiftable ratio-determining clutches, clutch actuating mechanism including a fluid pressure servo cylinder with a contained piston separating it into pressure and exhaust spaces the rod of the piston operating the said mechanism, an exhaust transfer passage formed in the wall of said cylinder, shifter springs urging said piston toward said pressure space, the combination of a cap for said cylinder consisting of an end cover for the pressure space, of a passage connected to said pressure space, of a ported exhaust passage connected to said exhaust transfer passage, and of a pressure feed fitting concentric with the port of said exhaust passage, said fitting acting as a closure member for said pressure space passage, oppositely placed valve seats formed in said fitting and about the said exhaust passage port, and the combination including a flexible valve mounted within said fitting urged by a spring to close the pressure feed to said fitting while connecting the pressure and exhaust transfer passages.

9. In power transmissions having clutch mechanism operable to change drive ratio, a clutch shifting device embodying a clutch servo cylinder having end spaces connected by a passage and containing a piston and piston rod projecting from one end of the cylinder, said piston dividing the cylinder into pressure and exhaust spaces effectively joined by said passage, a spring in said cylinder surrounding said rod and bearing against the piston. The piston being moved toward the exhaust space by pressure delivered to the pressure space and being moved by said spring toward the said pressure space, said passage acting as a pressure transfer passage connected to said exhaust space, a feed passage, a transfer valve adapted to shut off the said transfer passage and to connect the pressure space with said feed passage under applied fluid pressure in one position and adapted to close the said feed passage and connect the said pressure space with the transfer passage in its other position, a spring urging said valve to occupy the said second position, control valving adapted to deliver fluid pressure to said feed passage or to cut it off therefrom, a shiftable relief valve located in said exhaust space having ports leading outward to exhaust said exhaust space, spring means arranged to apply a force to said device for moving the said piston toward the pressure space, and an abutment means moved by travel of said piston rod operable when said last-named spring means is effective to increase the opening of said relief valve during the urging of said piston toward the said pressure space by said piston spring when at the time said control valving has cut off the fluid pressure from said feed passage and said transfer valve is urged by its spring toward its second-named position.

10. In power transmissions having clutches for connecting power and load at different drive ratios, having clutch actuating mechanism, with a cylinder having a translatable piston dividing it into pressure and exhaust spaces, the piston being urged toward the pressure space by a shifter spring, a rod for said piston adapted to actuate said mechanism, a spring means adapted to apply a force to said piston augmenting the face of said first-named spring, the combination including endwalls for said spaces in said cylinder, a disc-shaped exhaust valve located about the said piston rod in said cylinder exhaust space and urged endwise against the endwall of the said exhaust space by said piston shifter spring, relief ports in said exhaust valve comprising one set of ports constantly open to exhaust and a second set of ports normally closed by the force of said piston spring, an exhaust passage connecting said spaces, pressure responsive valving adapted to close said exhaust passage under feed pressure while connecting feed pressure to said pressure space and adapted to connect said exhaust passage with said pressure space under spring force when not responding to feed pressure, and an abutment moved by said piston rod subject to the force of said spring means and operative to augment said piston shifter spring force and operative to open said exhaust valve for relieving pressure thru said second set of ports whereby the body of pressure fluid initially admitted to said pressure space by said pressure responsive valving and transferred to the said exhaust space by the action of the said valve spring is rapidly exhausted from the exhaust space by the full opening of said exhaust valve.

11. In power control devices, the combination of a pair of friction clutches arranged to be made selectively operable for transmitting power for different drive operating conditions, a fluid pressure actuating mechanism for said clutches including a reciprocable member, the combination including a speed responsive control means, and including a fluid pressure directing valve and a pressure responsive valve for said mechanism to cause said member to reciprocate, a manually operable control connected to set aside the action of said speed responsive control means upon said pressure directing valve and cause reciprocation of said member in one position of said manually operable control, said fluid pressure directing valve being subject to the said speed responsive control means for causing said mechanism to reciprocate said member, and said directing valve being movable to cut off pressure from said mechanism, said pressure responsive valve being included in said mechanism and responsive to the pressure directed to said mechanism by said directing valve, a piston of said mechanism connected to reciprocate said member and a cylinder for said piston having a pressure space and an exhaust space connected to said pressure responsive valve, the latter valve being automatically effective to transfer the body of air which has been directed to the pressure space by the directing valve to the exhaust space when said directing valve cuts off the pressure from said mechanism.

12. In power controlled apparatus for power operated clutches, a clutch operator member, a clutch servo cylinder, a movable clutch operating piston for said member dividing said cylinder into pressure and exhaust spaces, a rod of said piston arranged to operate said member, spring means normally urging said piston toward the said pressure space, an exhaust port for said exhaust space operative to relieve pressure from the said space, a transfer passage connecting said spaces, control valving connected to said cylinder, said valving comprising a pressure directing valve operative to deliver an air body under pressure to said pressure space through a feed passage for causing said piston to move toward the said exhaust space and operative to cut off the pressure delivered to said feed passage, a pressure-responsive transfer valve in said transfer passage subject to the servo pressure delivered by said directing valve and operative to close said transfer passage when the servo pressure is so delivered, and further operative to open said transfer passage when the said directing valve cuts off the said pressure to said feed passage, and a normally closed exhaust valve for said exhaust space made movable by said piston rod when said rod is urged by said spring means to augment the exhaust action provided by said first-named exhaust port, the arrangement of said piston, said valves, said ports and said spaces providing one operating condition when said air body is transferred from said pressure space to said exhaust space by the action of said transfer valve and providing a second operating condition when said air body is released from the exhaust space by the opening of said exhaust valve by said piston rod.

13. In power control devices embodying controllable clutches and means for controlling same, a clutch operating member, a clutch operating mechanism for said member including a servo cylinder containing two pressure chambers, a servo piston subject to the pressures of said chambers arranged to shift said member to selected clutch operating positions, said piston occupying end point position in said cylinder, a supply source providing fluid pressure to said servo cylinder, spring means biasing said mechanism to one end point position, a valve movable to direct the pressure from said supply source to said cylinder so as to oppose said spring or to vent the pressure from one chamber of said cylinder, selectively operable controls effective to move the said valve to pressure delivery and to venting positions for said chamber, an element made operative by said controls to stop the said piston and said member at a central point between said end point positions, an arrangement of the said controls including a selective operation effective to move said valve to pressure delivery position while causing operation of said element to provide the said stop action, said arrangement including a selective operation effective to move said valve to a pressure relief position for one of said chambers, and pressure-responsive valve means controlling the pressure relieved by said first-named valve and operative to re-direct same to the other of said chambers.

14. In auxiliary power devices, a servo mechanism adapted to apply force in one direction by spring action and in the opposite direction by fluid pressure force to an operating member, a cylinder of said mechanism having a fluid pressure and an exhaust space, said cylinder containing a sliding piston separating the spaces and having a rod for said member, an end wall of said cylinder apertured to permit motion of said rod therethrough, biasing spring means for said piston arranged to hold said piston and rod so that the piston occupies a pressure space position, a shiftable retainer for said spring means arranged to abut said end wall and thereby provide reaction for the biasing action of said spring means, control valves and passages arranged to apply servo pressure to said pressure space to oppose the said spring means and also to cut off pressure therefrom, and transfer the fluid pressure remaining therein to said exhaust space, and exhaust ports formed in said shiftable retainer and said end wall operative to relieve the said exhaust space pressure during the interval when said pressure is transferred to said exhaust space pressure.

15. In power transmissions provided with pressure fluid supply systems and friction clutches for establishing different drive ratios under control of fluid directing valving to feed pressure fluid to actuator mechanism for such clutches, the combination of control valve means including a pressure fluid directing valve and a pressure-responsive valve subject to the pressure of the fluid directed by said first-named valve of said means to said second-named valve, a clutch actuator mechanism, a clutch made operable by said mechanism, a pressure feed connection from said directing valve to said mechanism operative to deliver pressure fluid to cause actuation of said clutch and said mechanism, including an actuator piston in a cylinder having a pressure head at one end and an exhaust head at the other, with a pressure transfer space adapted to connect said heads, having a passage closed by said pressure-responsive valve when the said pressure fluid directing valve feeds to said connection to select actuation of said clutch by said mechanism and having said passage opened when the said pressure fluid directing valve is set to cause said mechanism to release said clutch.

HANS O. SCHJOLIN.

References Cited in the file of this patent

UNITED STATES PATENTS

| Number | Name | Date |
|---|---|---|
| 2,040,580 | Vorech | May 12, 1936 |
| 2,204,672 | Folberth | June 18, 1940 |
| 2,241,374 | Alfieri | May 13, 1941 |
| 2,338,845 | Gunner | Jan. 11, 1944 |
| 2,343,316 | Newkirk | Mar. 7, 1944 |
| 2,344,055 | Osborn | Mar. 14, 1944 |
| 2,380,677 | Schjolin | July 3, 1945 |
| 2,406,747 | Davis | Sept. 3, 1946 |